March 11, 1958 J. J. LENTZ 2,826,357

HIGH SPEED READ-OUT ARRANGEMENT FOR DATA STORAGE DEVICES

Filed Dec. 21, 1951 7 Sheets-Sheet 1

INVENTOR
JOHN J. LENTZ
BY John F. Hanifin
ATTORNEY

March 11, 1958 J. J. LENTZ 2,826,357

HIGH SPEED READ-OUT ARRANGEMENT FOR DATA STORAGE DEVICES

Filed Dec. 21, 1951 7 Sheets-Sheet 2

INVENTOR
JOHN J. LENTZ

BY

John F. Hanifin
ATTORNEY

INVENTOR
JOHN J. LENTZ
BY John F. Hanifin
ATTORNEY

March 11, 1958 J. J. LENTZ 2,826,357
HIGH SPEED READ-OUT ARRANGEMENT FOR DATA STORAGE DEVICES
Filed Dec. 21, 1951 7 Sheets-Sheet 4

INVENTOR
JOHN J LENTZ
BY John F. Hanifin
ATTORNEY

March 11, 1958 J. J. LENTZ 2,826,357

HIGH SPEED READ-OUT ARRANGEMENT FOR DATA STORAGE DEVICES

Filed Dec. 21, 1951 7 Sheets-Sheet 5

INVENTOR
JOHN J. LENTZ
BY John F. Hanifin
ATTORNEY

HIGH SPEED READ-OUT ARRANGEMENT FOR DATA STORAGE DEVICES

Filed Dec. 21, 1951 7 Sheets-Sheet 6

INVENTOR.
JOHN J. LENTZ
BY
Wesley De Bruin
ATTORNEY

March 11, 1958 J. J. LENTZ 2,826,357

HIGH SPEED READ-OUT ARRANGEMENT FOR DATA STORAGE DEVICES

Filed Dec. 21, 1951 7 Sheets-Sheet 7

INVENTOR
JOHN J. LENTZ
BY John F. Hanifin
ATTORNEY

United States Patent Office 2,826,357

Patented Mar. 11, 1958

2,826,357

HIGH SPEED READ-OUT ARRANGEMENT FOR DATA STORAGE DEVICES

John J. Lentz, Chappaqua, N. Y., assignor to International Business Machines Corporation, New York, N. Y., a corporation of New York Application December 21, 1951, Serial No. 262,801

2 Claims. (Cl. 235—61)

This invention relates generally to memory or data storage devices and more particularly to data storage devices for use with high speed computers or calculators and devices for reading out the data therefrom.

Data storage devices have many important applications, perhaps the most important and best known being in the computer field. Storage in such applications must be capable of receiving information, retaining it as long as desired, and then emitting the information whenever desired. In some instances it is necessary to utilize the same information many times, so that the read-out means must be operative so as not to erase or clear-out stored information.

A simple means of storage is a static storage such as a coded arrangement of a bank of electro-magnetic relays having energized and deenergized or On and Off conditions. When the relay is On, the storage of a value, i. e., the weighted value of the relay, is represented. A limitation on the use of such relay storage devices of the prior art is the relatively slow speed at which the electro-mechanical relay system can be read out. In present day electronic calculator systems, the read-out of information from storage must be accomplished in a period of time of the order of a few microseconds, if efficient operation of the computer section is to be realized. Relay and similar static storage therefore is efficient in high speed computations only if some means is available to produce a very rapid read-out of the stored information.

It is therefore an object of this invention to provide an electromechanical relay storage system having high speed read-out means.

A further object is to provide an electronic read-out for a static storage system.

Another object is to provide a static storage system having a high speed read-out in which information can be held in storage indefinitely.

A further object is to provide a read-out arrangement for a storage system in which a high speed probing means successively assumes conditions representative respectively of each character in a series of characters selectively storable by the system, a read-out being obtained immediately upon coincidence of the character representation in the probing means and the character actually stored.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a block diagram illustrating how Figs. 1A through 1E are to be connected to form a complete detailed circuit diagram.

Figs. 1A, 1B, 1C, 1D and 1E taken together as illustrated in Fig. 1 comprise a wiring diagram of the read-on, storage, and read-out circuits as arranged for a relay storage for use with a typical high computer.

Fig. 1F discloses a stage-by-stage functional block diagram of the novel data storage device disclosed herein.

Figure 1:
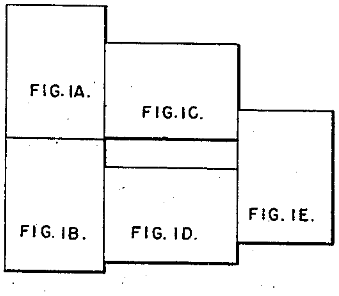
Figure 1A:
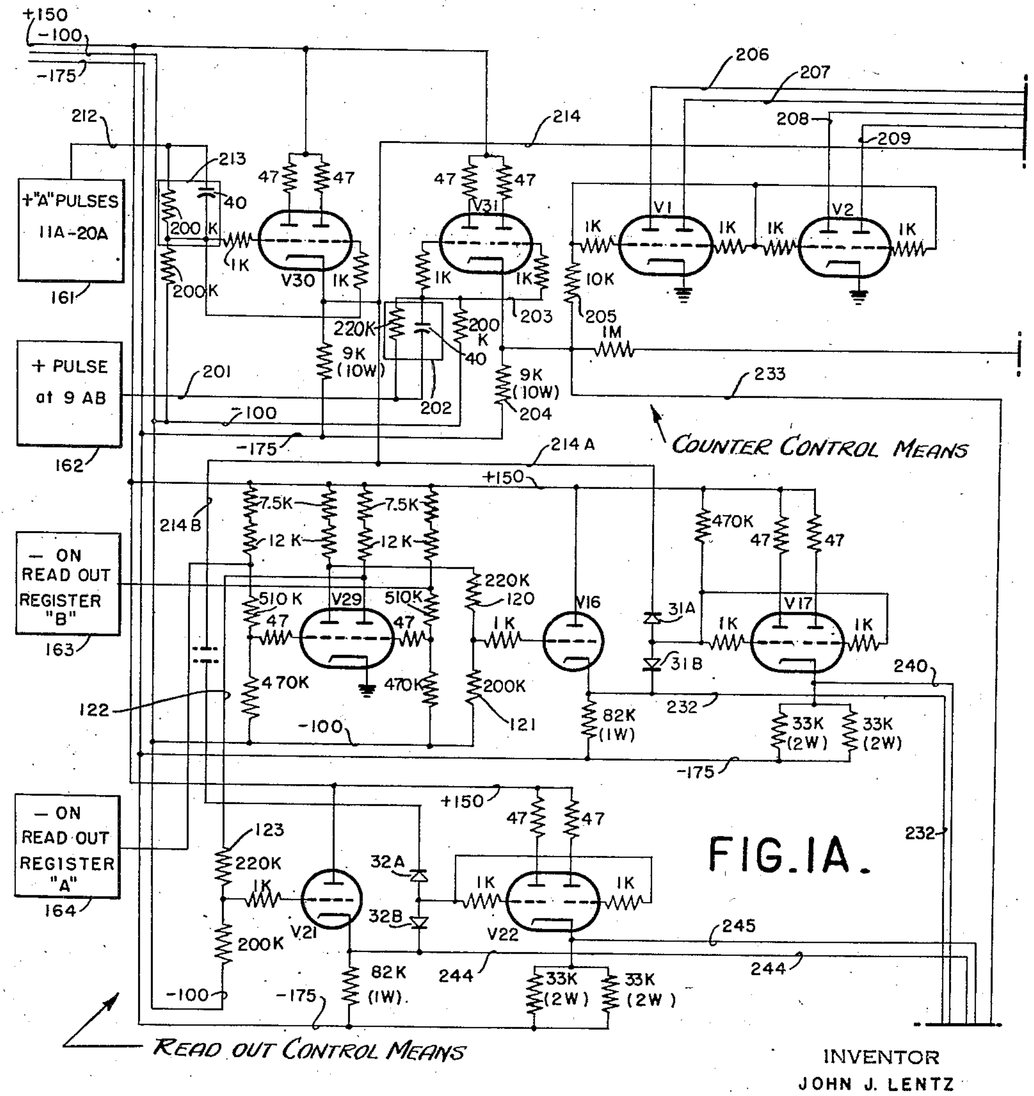
Figure 1B:
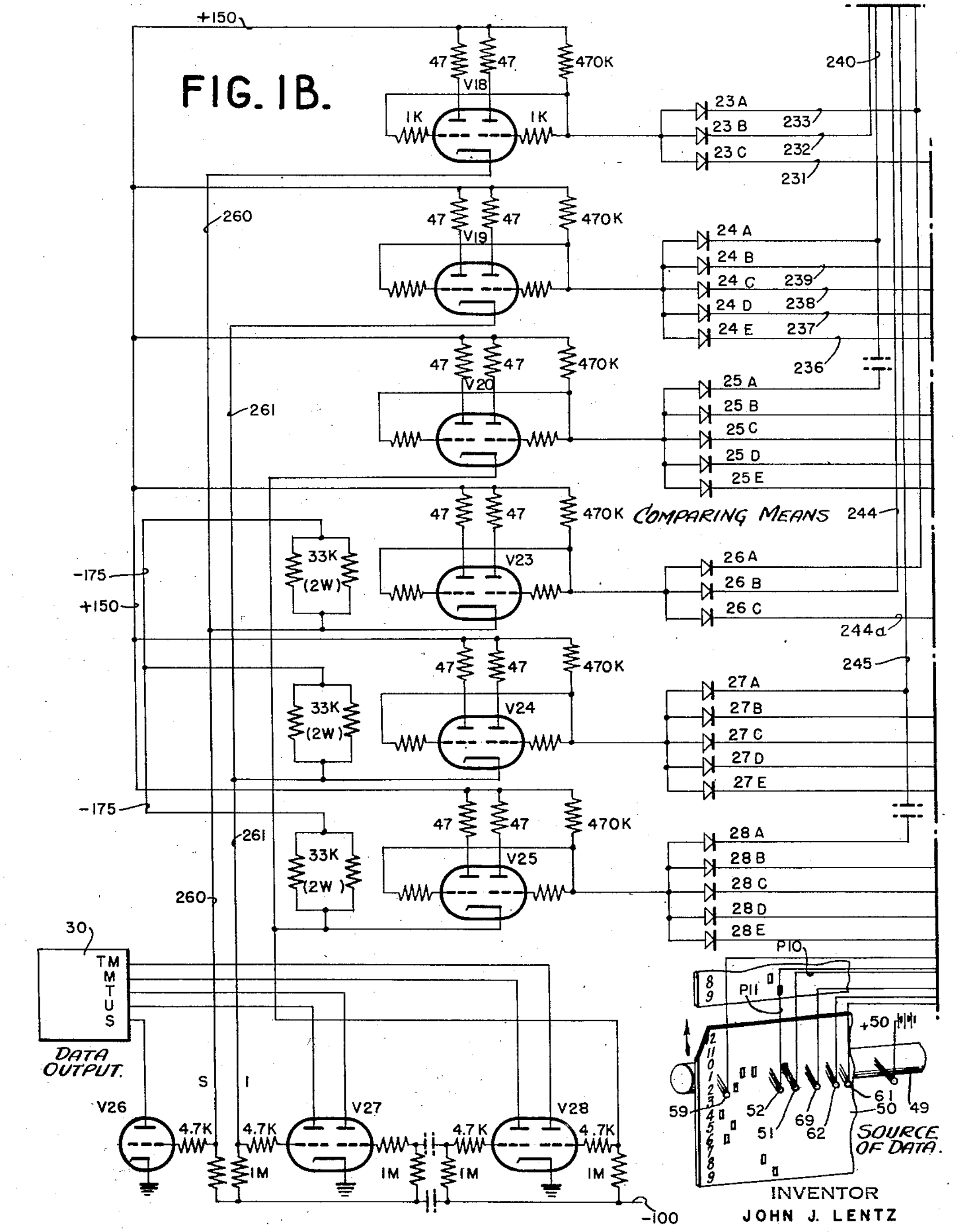
Figure 1C:
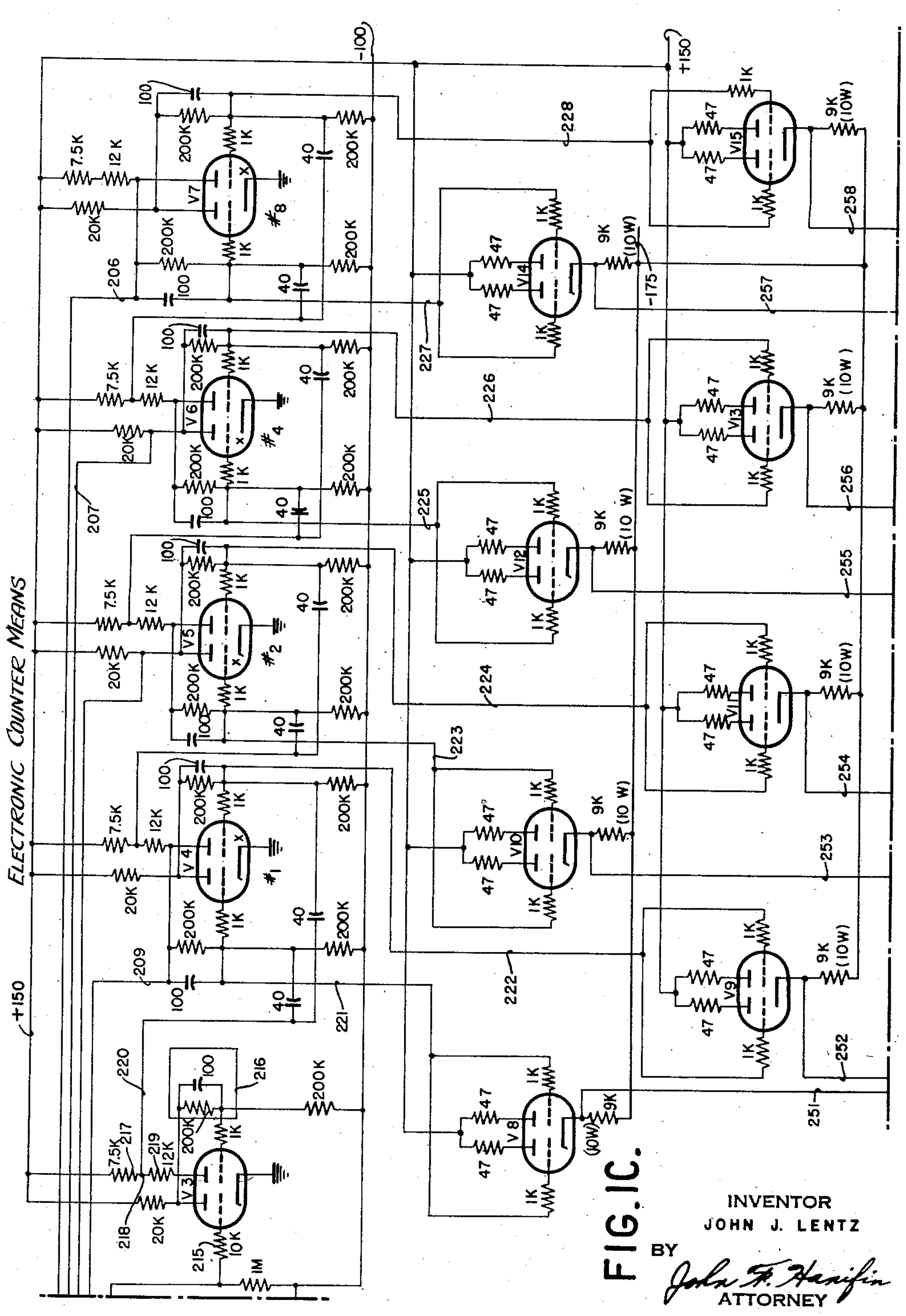
Figure 1D:
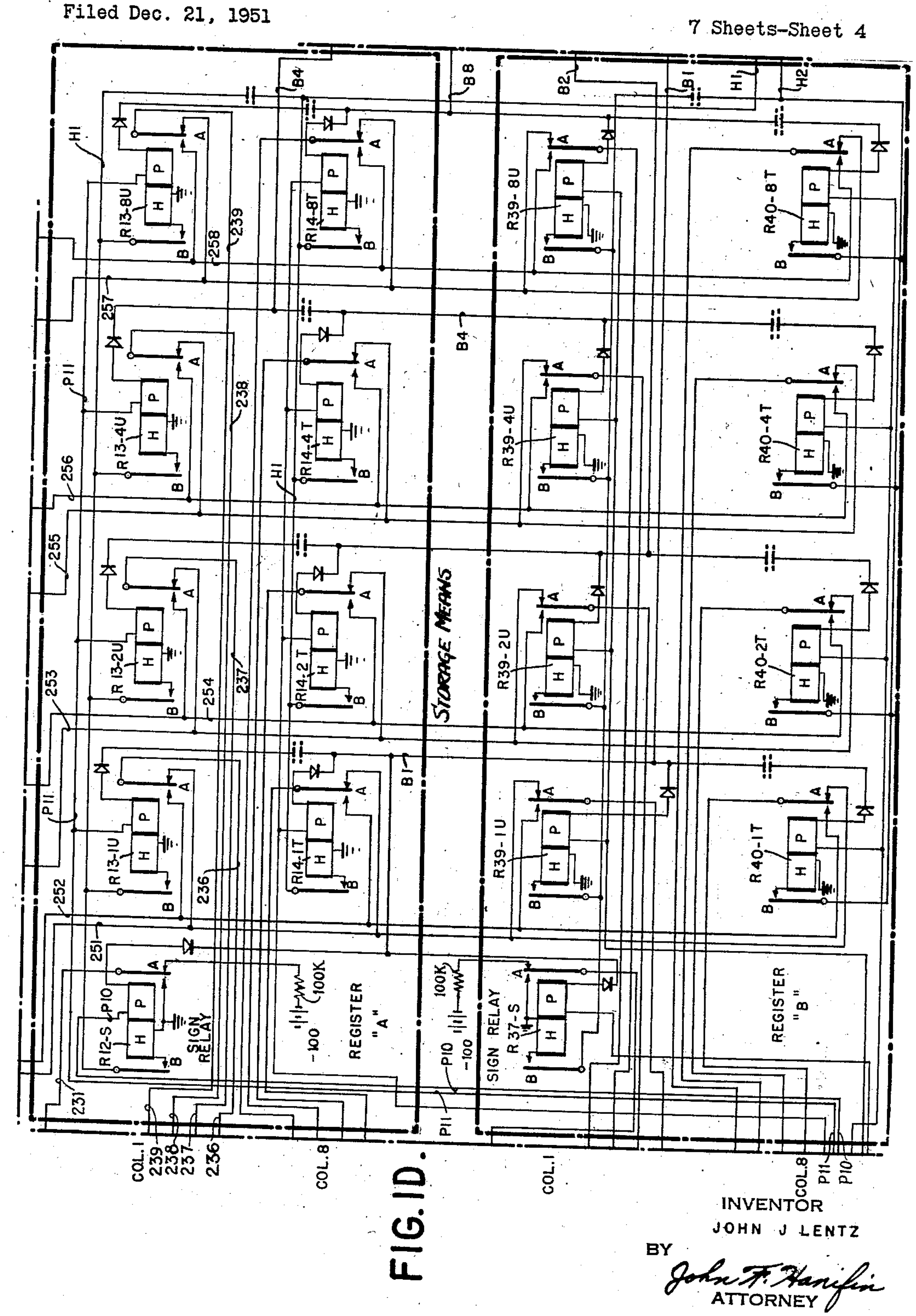
Figure 1E:
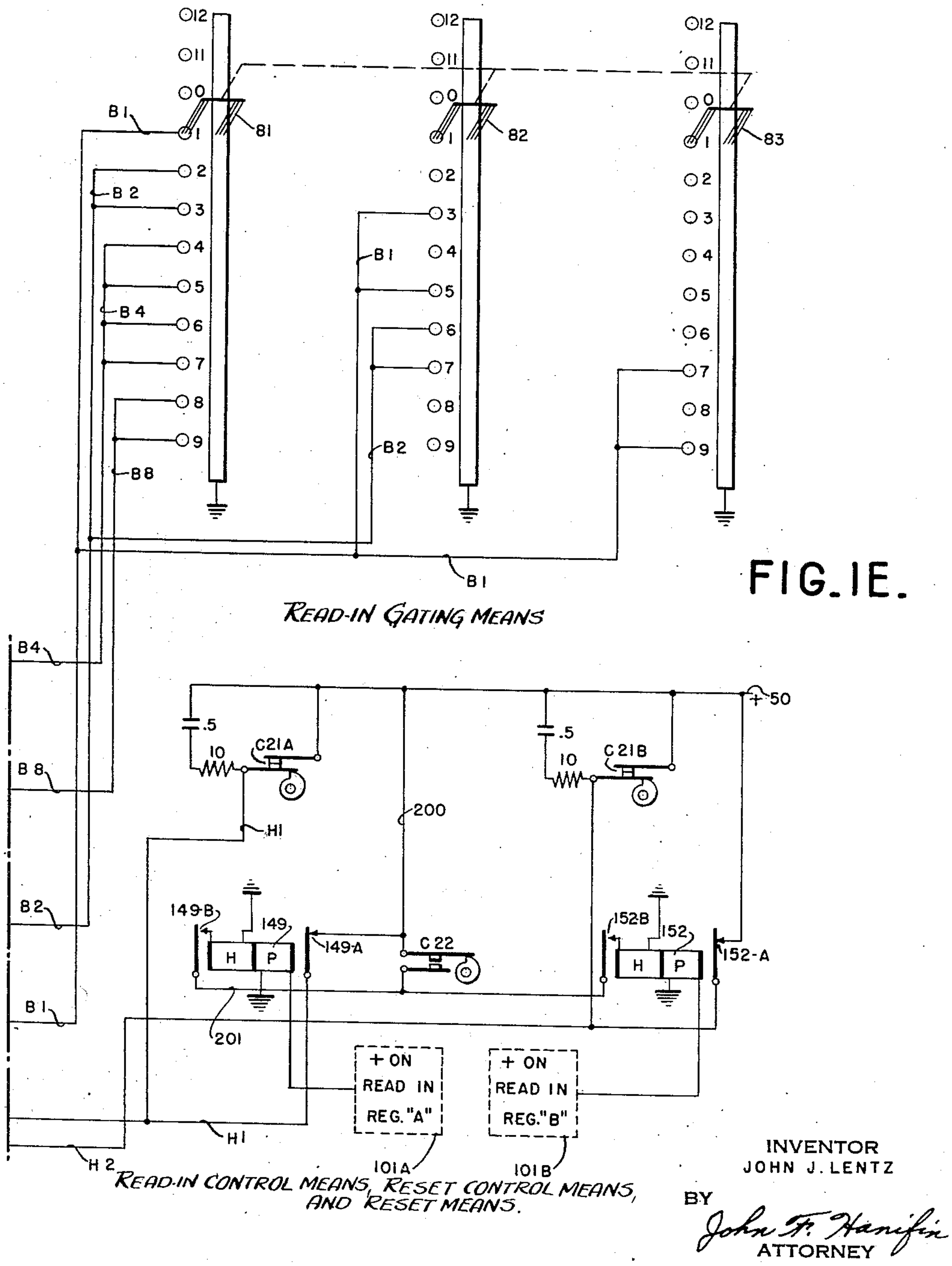
Figure 1F:
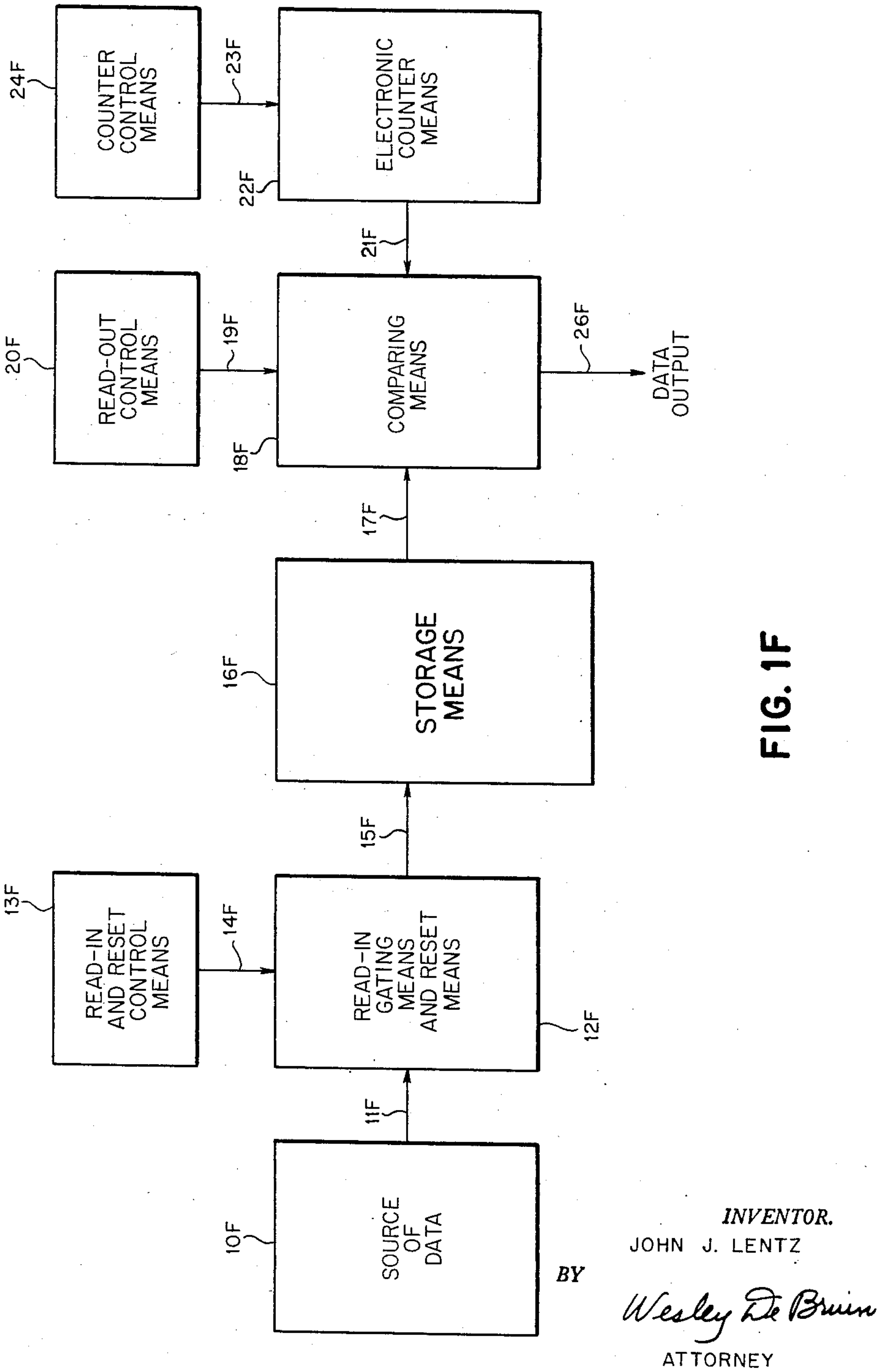

Referring to Fig. 1F, data from a source of data represented by block 10F is conveyed over connections 11F to read-in gating means and reset means 12F. The read-in gating means and reset means 12F is under control of read-in and reset control means 13F. When the read-in and reset control means 13F through the medium of connections 14F conditions the read-in gating means information or data from the source of data 10F passes via connections 11F, gating means 12F and connections 15F to storage means 16F. Storage means 16F is any type of conventional storage means wherein the data can be retained for an indefinite period of time.

Still referring to Fig. 1F: Counter control means 24F through the medium of connections 23F causes electronic counter means 22F to cycle, i. e., run through a sequence of character representations. It will be seen that electronic counter means 22F is connected via connections 21F to comparing means 18F and that storage means 16F is connected to said comparing means via connections 17F. However, whether an effective comparison between the data stored in storage means 16F and the successive character representations of electronic counter means 22F takes place is determined by read-out control means 20F. Read-out control means 20F is connected via connections 19F to comparing means 18F. When a comparison is made and the data stored in storage means 16F is identical with, i. e., equal to, the counter representation, an output will appear at connections 26F.

It is to be noted that "read-in" from the source of data 10F to the storage means 16F is under control of the read-in and reset control means 13F and from the detailed explanation hereinafter it will be seen that when the device is conditioned for "read-in" it will inherently reset the storage means prior thereto. It is also to be noted that "read-out" is under the control of the read-out control means 20F and that an actual comparison between the data stored in storage means 16F and the setting of electronic counter means 22F is not made in the absence of read-out control means 20F being properly conditioned.

It should be noted that the values of the voltages and circuit components used to carry out the invention as indicated on the drawings are approximate only, and illustrate one set of values which produce efficient operations. Other values may be used where the type of components change. The values of the resistors are expressed in ohms with the wattage rating also indicated in some cases. Condenser values are in micromicrofarads and line potentials in volts. The electromechanical relays illustrated in the various figures have two coil sections labeled P and H, respectively representing the pick-up and the hold coils thereof. The rectifiers shown in conjunction with the relays, which as actually employed are diodes, are to prevent back circuits. The other rectifiers employed as part of the probing circuits are also diodes.

The storage device described herein can be adapted for varied use, but special reference will be made herein to its use with an electronic calculator of the type described in the United States Patent of R. L. Palmer et al. No. 2,658,681 granted November 10, 1953.

*Read-in*

Figure 2:
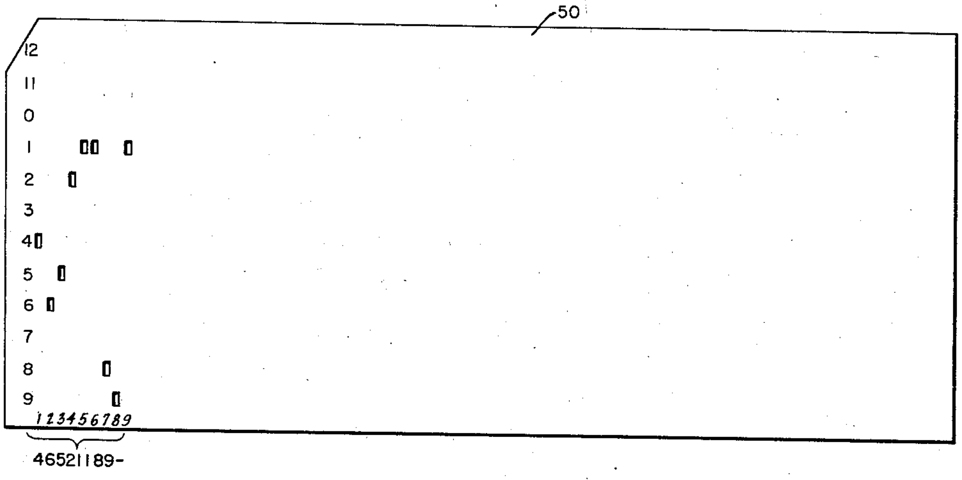
Fig. 2 is a view of a typical record card punched with information to be read into the storage device.

Illustrated in Fig. 2 is a record card of a well known punched card type provided with vertical columns in which the digits 1 to 9 may be recorded by perforations made in horizontal rows of index points having the values 1 to 9 as shown. The additional horizontal rows labeled 12, 11 and 0 are called field rows and can be perforated in coded combinations with the rows 1 to 9 to represent alphabetical or other characters. Cards of this type are advanced by feed rollers to pass a row of sensing brushes in a machine such as the calculators of said Palmer et al. patent, with the 12 row passing first and the 9 row passing last to read the information recorded therein into storage.

Figure 3:
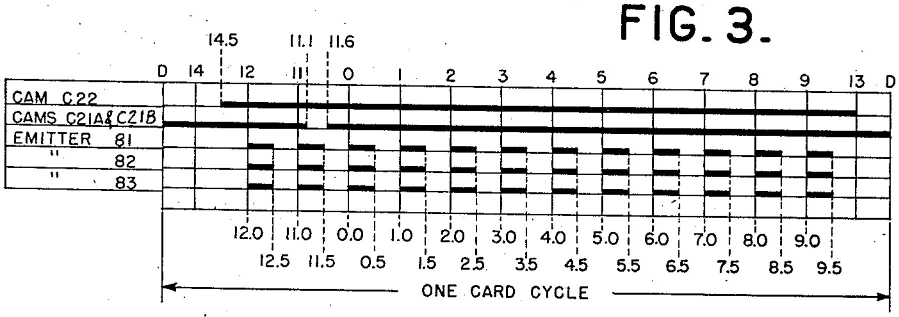
Fig. 3 is a timing diagram of the operation of certain machine elements of the computer during one card cycle.

The interval between which the corresponding rows of two successive cards pass the sensing brushes is termed a cycle of operation or one card cycle, and this card cycle is subdivided into fourteen cycle points. The period in a card cycle during which the indicated card value positions pass the sensing brushes in the machine is shown in Fig. 3 in relation to the timing of closure of a number of cam and emitter operated contacts, which are driven from a suitable shaft in synchronism with the card feed rollers.

The particular card illustrated in Fig. 2 is perforated in columns 1 through 9 to represent the negative number —46521189, the algebraic sign designation (minus) in this instance being recorded by a perforation in column 9, index point 1 with the units digit in column 8, the tens digit in column 7, etc. Such location of the sign representing perforation lends itself to circuit simplicity. Thus, column 9, index point 1 is punched only if the number represented is negative, while the absence of such a perforation indicates a positive number. It is to be noted, however, that by means of a different circuit illustrated in the above mentioned Palmer et al. patent, a perforation in the 11 or 12 index position of one of the digital columns can be used for sign recording.

The operation of the read-in circuit will be understood from inspection of the circuit diagram (Figs. 1A through E) taken together with the other figures of the drawings. Briefly, when a sensing brush encounters a perforation in a particular column of a card, an energizing circuit is made from a positive voltage source, through the sensing brush, selected relays, and one or more of a plurality of emitters to ground. The relays are selected by the emitters which are driven synchronously with the card feed and are effective to translate information from the decimal notation on the punched card into the binary notation for storage in the relays.

For purposes of simplification, there is shown in Fig. 1D the relays employed for sign and for digit storage of the first and eighth order digits only of two distinct data registers A and B, although additional orders and additional registers may be employed. In register A, relay R12—S is employed for sign storage; the four relays R13—1U, R13—2U, R13—4U and R13—8U are for storing a first order digit in binary code; and the four relays R14—1T, R14—2T, R14—4T and R14—8T are for storing an eighth order digit in binary code. In register B, relay R37—S is employed for sign storage; the four relays R39—1U, R39—2U, R39—4U and R39—8U are for storing a first order digit in binary code; and the four relays R40—1T, R40—2T, R40—4T and R40—8T are for storing an eight order digit in binary code. It should also be understood that in each columnar order the respective ones of the four relays from left to right have weighted values of 1, 2, 4 and 8. Of course, other coding arrangements can be used if desired.

It is to be noted that during read-in times the emitters 81, 82 and 83 in Fig. 1E ground the lines B1, B2, B4 and B8 in the following sequences: at "1" card cycle time, line B1; at "2," line B2; at "3," lines B1 and B2; at "4," line B4; at "5," lines B1 and B4; at "6," lines B2 and B4; at "7," lines B1, B2 and B4; at "8," line B8; at "9," lines B1 and B8. In each of registers A and B, one side of the pickup coils of the sign relay and the relay having a 1 value are connected to line B1, while one side of the pickup coils of the 2, 4 and 8 value relays are connected to lines B2, B4 and B8 respectively. The other side of the pickup coil of the sign relay is connected to a corresponding sensing brush in Fig. 1B for the sign column of the card, while the other side of each of the pickup coils of the other relays of the register are connected to a corresponding sensing brush for the column of the card to which the register corresponds, there being different card columns and different brushes for different registers. When one of the brushes contacts a contact roll 49 through a perforation in the card, it thereby connects the pickup coil of the associated relay to a +50 volt supply which is connected to the contact roll.

Although the card illustrated in Fig. 2 was punched to represent —46521189, a specific, detailed explanation will be given for read-in to register A of the sign and the first order or units representation only (i. e. the read-in of —9 will be explained). The operations for the other orders are similar.

In the calculator of said Palmer et al. patent (No. 2,658,681), the calculate cycle ends at approximately 12.7 card cycle time. Referring to Fig. 3, this time falls between 12 and 11 of the card cycle and three-tenths of a point to the left of 11. At that card cycle time, if a read-in is to be made inot register A, a program read-in pulse is applied to the pickup coil of relay 149 (Fig. 1E). The source of such read-in pulse is represented schematically, for purposes of simplification, by block 101A (labeled+On Read in Register "A") but in practice such pulse may be emitted by the calculator or it may be obtained in a well known manner by sensing a hole, instructing read-in, in the card itself.

As the relay 149 is energized by the read-in pulse, the relay contacts 149A open and the relay contacts 149B close. A circuit is then completed from the +50 volt supply through a line 200, the then closed cam contacts C22, contacts 149B and the holding coil of relay 149 to ground. As the cam contacts C22 remain closed until card cycle time 13 as shown in Fig. 3, the relay 149 will be held energized until that time.

As will become apparent later, the relays of register A in Fig. 1D, after being selectively energized through the energization of their pick-up coils, are maintained energized by a voltage applied to their holding coils from line H1 (Figs. 1D and 1E). Line H1 normally has +50 volts thereon applied from the +50 volt supply line in Fig. 1E through line 200 and normally closed contacts 149A of relay 149. However, when the read-in pulse energizes relay 149, the relay contacts 149A are opened and the application of the +50 volt supply to the line H1 is under the control of cam contacts C21A (Figs. 3 and 1E) which are in parallel with line 200 and relay contacts 149A. As the cam contacts C21A open (Fig. 3) from 11.1 to 11.6 card cycle time, the +50 volts will be removed from the line H1 in Fig. 1E during that period and any prior storage in register A will be erased. After 11.6 the cam contacts C21A are again closed and the holding circuit of register A is primed through the reapplication of the +50 volts to the line H1, so that the relays thereof are capable of holding new data.

During all card cycles in which no read-in to register A is necessary, no read-in pulse is emitted from block 101A to operate relay 149, and the data previously stored will not be erased, since the voltage to the line H1 is then maintained from the +50 volt supply through the line 200 and the relay contacts 149A. The opening of one parallel branch by cam contacts C21A, with relay points 149A closed, has no effect.

It might be noted here that for read-in of register B the read-in pulse is supplied from block 101B (Fig. 1E)

to energize a relay 152 so that cam contacts C21B control the application of the +50 volts to a line H2 which is the hold line for register B corresponding to the hold line H1 for register A. This control is obtained in the same manner that block 101A, relay 149 and cam contacts C21A control the application of the +50 volts to the line H1. To prevent arcing on the opening of the cam contacts C21A or C21B, quenching circuits composed of 10 ohm resistors and 0.5 micromicrofarad condensers are provided.

Now with the data previously stored in register A erased, the storage of a —9 therein may proceed. As the card 50 in Fig. 1B progresses beneath the sensing brushes, no punched holes are sensed until row 1 reaches the sensing position at the "1" card cycle time. Then, the sensing brush 51, through the perforation in the card at index point 1 in column 9 representing a minus sign, makes contact with the contact roll 49. A circuit is then completed from the +50 volt supply through the contact roll 49, the sensing brush 51, line P10 (Fig. 1B to Fig. 1D), the pickup coil P of the sign storage relay R12—S, a diode rectifier, line B1 (Fig. 1D to Fig. 1E) and thence to the number 1 commutator contact of one of the emitters 81 to ground. As the sign storage relay R12—S picks up, a +50 volt potential (Fig. 1E) is applied through the cam contacts C21A and the parallel circuit thereof, including the line 200 and the normally closed contacts 149A of a relay 149, to the line H1 (Fig. 1E to Fig. 1D) and thence through the self-holding contacts B and the holding coil of relay R12—S to ground.

As the card proceeds beneath the sensing brushes in Fig. 1B, various values represented by other punched holes in the card are stored in other relays. However, the present explanation, as indicated, refers to the entry of a —9 only, and, therefore, the next entry to be explained occurs at "9" card cycle time. At that time a hole in units column 8 at index point 9, representing the digit "9," is sensed and a voltage of +50 volts is applied through the contact roll 49 (Fig. 1B), the register "A" units column sensing brush 52, line P11 (Fig. 1B to Fig. 1D) to one side of the pickup coils of relays R13—1U, R13—2U, R13—4U and R13—8U. However, at "9" card cycle time, circuits are completed only through the relays R13—1U (value 1) and R13—8U (value 8), respectively as follows: from the pickup coil of relay R13—1U, through its corresponding diode, the line B1 (Fig. 1D to Fig. 1E) and the number 9 commutator point of one of the emitters 83 to ground; and from the pickup coil of relay R13—8U, through its corresponding diode, the line B8 (Fig. 1D to Fig. 1E) and the number 9 commutator point of the emitter 81 to ground. Circuits from the pickup coils of relays R13—2U and R13—4U can be traced through their diodes to lines B2 and B4 (Fig. 1D to Fig. 1E) respectively, but at 9 card cycle time, neither line is grounded through the contact points of any of the emitters 81, 82 and 83. Thus, the "9" decimal notation of the punched card is converted to the relay stored value of a 9 in the binary notation by the emitters 81 and 83.

The holding circuit of all relays of register A is similar to and in parallel with that explained for the sign relay R12—S. The +50 volt potential available at line H1 (Figs. 1E and 1D) is applied through the contacts R13—1UB and R13—8UB to the respective hold coils of relays R13—1U and R13—8U. Thus, relays R12—S, R13—1U and R13—8U are energized and represent the storage of a —9 value in register "A."

It is apparent that, by reason of the emitter operation together with the relay connections, any decimal value represented by the perforation in the card may be translated into a selective energization of the relays of a selected register to form an Off-On pattern representing the same value in binary notation. Further, it is also apparent that data may be read in by other well known means.

*Read-out*

The information stored on the relays of the registers in Fig. 1D may be read out at high speed in response to a proper control impulse and delivered to the calculator in the form of time-coded voltage pulses. Briefly, the read-out circuit includes a four trigger, binary, electronic counter which is caused to progress through a series of Off-On patterns representing different digital values under the control of triggering pulses supplied by the primary timer of the calculator of the Palmer et al. Patent No. 2,658,681. There are at least ten different Off-On patterns of the counter which are respectively representative of the values 9, 8, 7, 6, 5, 4, 3, 2, 1, and 0. These Off-On patterns are compared as they occur with the Off-On patterns of each of the groups of four electromechanical relays in a selected one of the registers, which relay patterns were established on prior read-in of a given number. The comparison is made by means of a multi-element coincidence network and when a coincidence is discovered between an Off-On pattern of the counter, and the stored Off-On pattern of a group of relays in a register, a voltage pulse is generated and transmitted to the calculator. The time at which this voltage pulse occurs is representative of the value of the digit stored in that group of relays. This voltage pulse is transmitted to the calculator over an appropriate one of a group of wires with the particular wire employed being itself representative of the columnar position or order of the stored digit.

Figure 4:
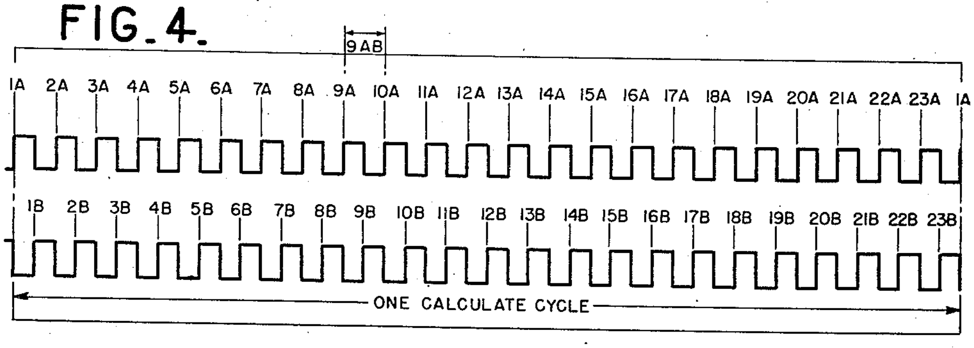
Fig. 4 is a timing diagram, on a greatly increased scale relative to Fig. 3, illustrating a complete electronic calculate cycle of the computer.

In considering the detailed operation of the read-out circuit it will be noted that in the Palmer et al. Patent, No. 2,658,681, calculation takes place between 13.0 and 12.7 card cycle time. This time for calculation is divided into repeated calculate cycles and a series of so-called "A" and "B" pulses are generated in each calculate cycle as illustrated in Fig. 4. Each of these pulses is approximately ten microseconds in length with each pulse deriving its nomenclature from its starting time. For example, the "1A" pulse is the first positive pulse on the top line of Fig. 4 and it starts, as indicated, at 1A time. The "B" pulses alternate with the "A" pulses, with the first positive pulse occurring on the bottom line of Fig. 4 regarded as the 1B pulse since it starts at 1B time. It is to be noted that in this nomenclature the number assigned to an A or a B pulse is not a digital value. However, the 11A to 20A pulses of the calculate cycle occur at times assigned to represent the digits 9 to 0, respectively. The 11A through 20A pulses are therefore selected from the A pulses of the calculator for read-out purposes and such source is represented for convenience as block 161 (Fig. 1A). These 11A through 20A pulses are employed to effect stepping of the electronic counter through a succession of On-Off patterns representing different values.

In the calculator the Palmer et al. Patent, No. 2,658,681, there is also generated once each calculate cycle, a positive voltage pulse of approximately 20 microseconds duration beginning at 9A time. This pulse, called the +9AB pulse (Fig. 4) is supplied from the calculator to the storage device herein described to effect resetting of the electronic counter to a 9 value Off-On pattern, such source being represented for convenience as block 162 (Fig. 1A).

The electronic counter (Fig. 1C) comprises four trigger circuits connected in cascade in a well-known manner for straight binary operation in response to applied triggering pulses. Each trigger circuit is of the well known Eccles-Jordan type having two alternate stable states and includes a dual triode with the left-hand half of the triode being conductive and the right-hand half being nonconductive in the first stable state, referred to as the Off condition, and the right-hand half of the triode being conductive and the left-hand half being non-conductive in the second stable state referred to as the On condition.

The four trigger circuit stages of the counter, illustrated in Fig. 1C, include dual triode tubes V4, V5, V6 and V7 respectively. The trigger circuits being connected in cascade for binary operation, the first trigger circuit incorporating tube V4 is shifted once from Off to On, or On to Off, as the case may be, with each negative going pulse applied to the counter. Then the second trigger circuit is shifted once with each shifting of the first trigger circuit from Off to On; the third trigger circuit is shifted once with each shifting of the second trigger circuit from Off to On; and the fourth trigger circuit is shifted once with each shifting of the third trigger circuit from Off to On. Combinations on such On and Off conditions of the four triggers, in a well-known manner represent digital values of 0 through 9 in the same coding used in the groups of register relays (R13—1U to R13—8U, etc.) in Fig. 1D, an energized relay corresponding to an On trigger circuit or an On tube (right-hand half conducting) of a trigger circuit. Thus, tubes V4, V5, V6 and V7 may be considered as corresponding to relays R13—1U, R13—2U, R13—4U and R13—8U respectively, of the first order of register A, and to the corresponding relays in the other orders of register A and all the orders of register B.

In resetting the counter to its 9 Off-On pattern prior to the comparison step, the +9AB pulse from block 162 (Fig. 1A) is applied via line 201, a resistor condenser network 202, and line 203 to the grids of a dual triode cathode follower tube V31, and a positive output pulse is supplied from the cathode resistor 204 thereof, to the parallel connected grids of dual triodes V1 and V2, via resistor 205 and their respective grid resistors.

The dual triodes V1 and V2 (Fig. 1A) serve to reset the trigger circuits of the four-stage binary electronic counter including tubes V4, V5, V6 and V7 (Fig. 1C). A voltage drop in each of the four respective plate circuits of triodes V1 and V2 is applied via lines 206 and 209 (Figs. 1A to 1C) to the left grids of each of the tubes V4 and V7 and via lines 207 and 208 (Fig. 1A to Fig. 1C) to the right grids of tubes V5 and V6, to reset the electronic counter to the 9 Off-On pattern in which tubes V4 and V7 are On and tubes V5 and V6 are Off.

After resetting of the counter, the subsequent 11A through 20A pulses at block 161 (Fig. 1A) are applied via line 212 and the resistor-condenser network 213, to both grids of a cathode follower tube V30 and via its cathode circuit and line 214 to the grid resistor 215 at the left grid of an amplifier tube V3 in Fig. 1C. The amplifier tube V3 has two stages and serves to shape and amplify the pulses to make them suitable for use as counter triggering pulses, and to introduce a slight delay of the A pulses due to stray circuit capacitances, which delay is helpful in preventing pulse overlapping in the operation of the read-out circuit. Thus, a slightly delayed negative pulse is developed at the left-hand plate of tube V3 and is fed to the right grid of the same tube through the resistor-condenser network 216. From a tap 218 intermediate the plate resistors 217 and 219 of tube V3 a further delayed positive "A" pulse is fed via line 220 to the grids of tube V4 of the 1 value trigger.

The trigger circuits incorporating tubes V4 through V7 are arranged to be responsive only to negative pulses applied to their inputs. Consequently, the leading edge of a delayed "A" pulse supplied to the trigger circuit incorporating tube V4 has no effect, but the trailing edge will cause that trigger circuit to shift from one stable state to the other. The 11A through 19A pulses cause the counter to assume successively (assuming an initial reset condition of 9, as described above) the 8, 7, 6, 5, 4, 3, 2, 1 and 0 Off-On patterns. The respective timing of the shifting of the first trigger circuit incorporating tube V4 by any one "A" pulse with regard to the operation of the same "A" pulse on the comparing means will be described below.

The counter patterns assumed at different calculate cycle times from 8B through 21A are set forth in the table below, wherein L signifies conduction of the left side of the trigger tube (trigger Off), and R signifies conduction of the right side (trigger On). It is to be remembered that in the time code of the caluclator 11A time is the 9 read-out time, 12A is the 8 read-out time, etc. Due to the fact that the counter is stepped by the trailing edge of the delayed "A" pulses, the Off-On pattern of the triggers will correspond in representative values to the time code at times substantially before, during and slightly after the time of the code. For example, 15A time is the 5 read-out time in the code of the calculator, and as the counter Off-On pattern is stepped from 6 to 5 by the trailing edge of the delayed 14A pulse (shortly after the beginning of the 14B pulse) and from 5 to 4 by the trailing edge of the delayed 15A pulse (shortly after the beginning of the 15B pulse), the counter will be representing 5 from a time approximately 9 microseconds before (assuming a delay in tube V3 of 1 microsecond), until approximately 1 microsecond after the 15A pulse.

| Calculate Cycle Time | Trigger Circuit Patterns V4—V5—V6—V7 | Value Represented in Counter |
|---|---|---|
| 8B | R—R—R—R | 15 |
| 9A (Reset) | R—L—L—R | 9 |
| 9B | R—L—L—R | 9 |
| 10A | R—L—L—R | 9 |
| 10B | R—L—L—R | 9 |
| 11A | R—L—L—R | 9 |
| 11B | L—L—L—R* | 8 |
| 12A | L—L—L—R | 8 |
| 12B | R—R—R—L* | 7 |
| 13A | R—R—R—L | 7 |
| 13B | L—R—R—L* | 6 |
| 14A | L—R—R—L | 6 |
| 14B | R—L—R—L* | 5 |
| 15A | R—L—R—L | 5 |
| 15B | L—L—R—L* | 4 |
| 16A | L—L—R—L | 4 |
| 16B | R—R—L—L* | 3 |
| 17A | R—R—L—L | 3 |
| 17B | L—R—L—L* | 2 |
| 18A | L—R—L—L | 2 |
| 18B | R—L—L—L* | 1 |
| 19A | R—L—L—L | 1 |
| 19B | L—L—L—L* | 0 |
| 20A | L—L—L—L | 0 |
| 20B | R—R—R—R* | 15 |
| 21A | R—R—R—R | 15 |

*Shift of trigger circuit pattern occurs shortly after beginning of indicated calculate cycle time.

It will be noted that the trailing edge of the 20A delayed pulse (shortly after the beginning of the 20B pulse) sets the counter to represent "15," but this is unimportant since the read-out ends with the termination of the 20A pulse, and this eleventh pattern is not employed in the read-out operation. The triggers rest in the pattern representing "15" until the receipt of the next +9AB pulse.

The voltages at the grids of the trigger tubes V4 to V7 vary between approximately ground potential and −35 volts. The left hand grids of the On trigger tubes are at −35 volts, while the right hand grids are at ground, and, vice versa, the left hand grids of the Off trigger tubes are at ground potential while the right hand grids are at −35 volts.

The counter passes through the cycle of Off-On patterns described above as long as the +9AB and the 11A through 20A pulses are supplied from the calculator whether or not read-out from a register is being effected. To obtain a read-out from any selected register, certain control pulses are to be supplied from the calculator according to the requirements of the calculator program. In Fig. 1A, the source of such a control pulse for effecting read-out of register A is diagrammatically represented as a box 164, while the control pulse source for read-out of register B is represented as a box 163. The control pulses are negative in that the normal output voltage of box 163 or 164, as the case may be, is approximately +140 volts but is dropped to about +50 volts during the control pulse. This control pulse is present from sometime prior to +9AB time until after 20A time.

When a control pulse is provided from either box 163 or box 164, the sign representation of the selected register is read out first during the +9AB pulse and the value represented in the register is read out during the succeeding 11A through 20A pulses. The sign read-out is accomplished through a triple coincidence circuit responsive to the +9AB pulse, the control pulse and an energized sign relay (representing a minus sign) and provides a pulse at the output at the +9AB time when a minus sign is read. The value read-out for a selected register is accomplished through a five-way coincidence circuit responsive to the 11A through 20A pulses, when a control pulse is present, and to an exact correspondence in condition of the four value relays of the register and the four triggers of the counter and provides a pulse at an appropriate output line at a time corresponding to the value stored.

Considering the sign read-out more specifically, the triple coincidence circuit for sign read-out of register A comprises three diode rectifiers 23A, 23B and 23C in Fig. 1B, with their anodes connected together and to the grids of a double triode V18 of a cathode follower circuit, so that the grids can be no more positive than that cathode of the three diodes which is at the lowest potential.

The cathode of diode 23A is connected by line 233 to the cathode of cathode follower tube V31, in Fig. 1A, which, as previously explained in connection with the resetting of the counter, provides a positive pulse at the time of the +9AB pulse. Thus, the diode 23A connections prevent the grids of triode V18 from becoming more positive, and so prevents triode V18 from becoming more conductive, except during +9AB time.

The cathode of diode 23B in Fig. 1B is connected to prevent triode V18 from becoming more conductive except during a control pulse from box 164 for read-out of register A. The negative control pulse from box 164 is applied to the grid of the left hand half of a dual triode V29, in Fig. 1A, connected as an amplifier. The resulting positive voltage pulse at the left hand plate of triode V29 is applied via resistor 120 to the grid of a tube V16 connected in a cathode follower circuit. The grid of tube V16 is also connected through a resistor 121 to a −100 volt line, so that it is normally at about −35 volts but is raised to approximately ground potential by the positive pulse from triode V29. The resulting positive voltage at the cathode of tube V16 is applied through line 232 to the cathode of diode 23B in Fig. 1B.

The cathode of diode 23C in Fig. 1B is connected through line 231 and transfer points A of normally deenergized sign relay R12—S of register A in Fig. 1D and a 100K resistor to a −100 volt supply. However, when sign relay R12—S is energized, representing a minus sign, the connection is through line 231 and transfer points A to ground. Thus, the connections of diode 23C prevent triode V18 in Fig. 1B from becoming more conductive except when a minus sign is stored in relay R12—S of register A.

It is then apparent that when a control pulse is provided from box 164 in Fig. 1A for read-out of register A, there will be no pulse from triode V18 if the sign is positive. But if the sign is negative, there will be a pulse at +9AB time at the cathode of triode V18. This pulse is applied to the grid of another tube V26, the anode of which is connected to a sign read-out line S of an exit channel 30, to provide a corresponding output pulse.

For the sign read-out of register B, another triple coincidence circuit is provided comprising a second set of three diode rectifiers 26A, 26B and 26C in Fig. 1B. These three diodes serve the same function in connection with register B as diodes 23A, 23B and 23C did with register A. Thus, the anodes of diodes 26A, 26B and 26C are connected to the grids of a double triode V23 so that the grids can be no more positive than the most negative voltage at the cathodes of the diodes. Triode V23 is connected in parallel cathode follower circuit arrangement with triode V18, so that a pulse at its cathode is applied to the grid of tube V26 and causes a corresponding pulse to appear on the sign read-out line S of exit channel 30.

The cathode of diode 26A is connected to line 233 so that, as explained in connection with diode 23A, it is raised to its more positive voltage during +9AB time.

The cathode of diode 26B is connected through line 244 to the cathode of a tube V21 in Fig. 1A of a cathode follower circuit. Tube V21 corresponds in the read-out of register B to tube V16 described in connection with the read-out of register A, and its grid is fed through line 122 and resistor 123 from the right hand plate of the dual triode V29. The right hand half of triode V29 is also connected as an amplifier and its grid receives the negative control pulse from box 163 for read-out of register B. Thus, diode 26B prevents triode V23 in Fig. 1B from becoming more conductive except during a control pulse for read-out of register B.

The cathodes of diode 26C is connected through transfer point A of sign relay R37—S of register B in Fig. 1D in a manner similar to the connection of diode 23C and transfer point A of sign relay R12—S of register A.

Thus, triode V23 becomes more conductive during +9AB time in response to a control pulse for read-out of register B only if a minus sign is stored in relay R37—S. It is then apparent that the sign is read out of register B when desired in a manner similar to that described for register A.

As previously mentioned, the value stored in a selected register is also read out in response to the control pulse from either box 163 or 164, as the case may be, during the 11A through 20A pulses. Considering the value read-out more specifically, a five-way coincidence circuit is provided comprising five diodes associated with each set of four relays for storing the digit of a single order of the stored number. Thus, in Fig. 1B, the five diodes 24A–E are associated with the first order relays of register A in Fig. 1D and diodes 25A–E are associated with the eighth order relays of register A. Similarly, other groups of five diodes, not shown, are provided for the relays of each of the other orders, not shown, of register A. The five diodes 27A–E are associated with the first order relays of register B while diodes 28A–E are associated with the eighth order relays of register B, intermediate orders not being shown.

The five diodes 24A–E in Fig. 1B, which comprise the five-way coincidence circuit for the first order of register A, have their anodes connected together and to the grids of a double triode V19 of a cathode follower circuit, so that the grids can be no more positive than the most negative voltage on the cathodes of the five diodes.

The cathode of diode 24A is connected to prevent the triode V19 from becoming more conductive except during each of the 11A–20A pulses from box 161 in Fig. 1A coincident with a control pulse from box 164 for read-out of register A. Line 240 connects the cathode of diode 24A in Fig. 1B to the cathode of a double triode V17 in Fig. 1A. The double triode V17 is connected in a cathode follower circuit with its two control grids connected together. The grids of triode V17 are connected through a diode 31A and line 214A to the cathode of dual triode V30, and are also connected through a diode 31B to the cathode of tube V16. As previously explained, triode V30 has a positive pulse appearing thereon during each of the 11A–20A pulses and the cathode of tube V16 has a positive pulse thereon throughout the control pulse from the box 164.

Since the diodes 31A and 31B in Fig. 1A form an "and" circuit, it is apparent that double triode V17 will become more conductive during each of the 11A–20A pulses so long as the control pulse for read-out of register A is applied. Accordingly by reason of the connection from the cathode of triode V17 through line 240 to the diode 24A in Fig. 1B, the dual triode V19 will be free to become more conductive when the other diodes 24B–E find a correspondence between the setting of the relays of the first order of register A and a pattern assumed by the counter.

Now as described hereinbefore, the counter in Fig. 1C includes four triggers comprising tubes V4, V5, V6 and V7, each of which is conductive in either its left or its right half at any instant, with the pattern of conductivity thereof being changed in steps during the 11A through 20A pulses to represent successively decreasing values from 9 to 0. As further pointed out, the tubes V4, V5, V6 and V7 of the triggers may be considered as corresponding to relays R13—1U, R13—2U, R13—4U and R13—8U, respectively, of register A, with conductivity of the left and right halves of a triode corresponding to a deenergized and energized relay, respectively. A plurality of pairs of tubes V8 and V9, V10 and V11, V12 and V13, V14 and V15 are provided for the left and right halves, respectively, of triodes V4, V5, V6 and V7. All of the tubes V8 through V15 are connected in parallel cathode follower circuits but their grids are connected individually to the corresponding left or right grid of the corresponding trigger tube. Thus, the cathode of each of the tubes V8 through V15 is at its most positive voltage, about ground voltage in the circuit shown, when the corresponding half of the corresponding one of trigger tubes V4 through V7 is conductive, and at its most negative voltage, about —35 volts, at all other times. In other words, when the left half of any of the trigger tubes V4, V5, V6 and V7 is conductive, the cathodes of the corrresponding ones of tubes V8, V10, V12 and V14 are at their most positive voltage; and when the right half of any of the trigger tubes is conductive, the cathodes of the corresponding ones of tubes V9, V11, V13 and V15 are at their most positive voltage.

To find a correspondence between the relay settings of the first order of register A and a counter pattern, the cathodes of diodes 24B–E are connected through lines 239, 238, 237 and 236, respectively, to the transfer points A of relays R13—8U, R13—4U, R13—2U and R13—1U respectively, of register A in Fig. 1D. When any one of these relays is deenergized, its transfer point A is connected to the cathode of that one of tubes V8, V10, V12 and V14 associated with the left half of the corresponding one of trigger tubes V4 through V7. When any one of these relays is energized, its transfer point A is connected to the cathode of that one of tubes V9, V11, V13, and V15 associated with the right half of the corresponding one of trigger tubes V4 through V7. It then follows that as the counter is caused to progress through the series of timed patterns by the 11A through 20A pulses, a coincidence of condition of a single relay and its corresponding trigger tube causes the cathode of the associated one of diodes 24B–E to become more positive. Therefore, at the time of one of pulses 11A through 20A, the condition or setting of all four relays in the first order of register A must correspond to the counter pattern and then the cathodes of all four of diodes 24B–E in Fig. 1B become more positive, and since the cathode of diode 24A is more positive during each of the 11A through 20A pulses, while the control pulse is applied, triode V19 becomes more conductive and remains in that state until the end of the particular 11A through 20A pulse referred to above.

Thus, a pulse appears at the cathode of triode V19 at a time corresponding to that one of the 11A to 20A pulses which represents the value stored in the first order of register A. The pulse appearing at the cathode of triode V19 in Fig. 1B is applied to the grid of one side of a double triode V27 connected to cause a corresponding pulse to appear on the first order or units line U of exit channel 30.

The five diodes 25A–E in Fig. 1B which comprise the five-way coincidence circuit for the eighth order of register A have their anodes connected together and to the grids of a double triode V20 of a cathode follower circuit corresponding to the double triode V19 for the first order of register A. However, while the output of triode V19 is applied to the grid of one side of a tube V27, the output of which feeds the units line U of the exit channel 30, the output of triode V20 is applied to the grid of one side of a tube V28, the output of which feeds the eighth order line TM of the exit channel 30.

The connection of the anodes of the five diodes 25A–E to the grids of triode V20 is such that the grids can be no more positive than the most negative voltage at the cathodes of the five diodes. The cathode of diode 25A is connected to line 240 in the same manner as the cathode of diode 24A for the first order of register A and therefore has a positive pulse thereon during each of the 11A–20A pulses throughout a control pulse for the read-out of register A.

The cathodes of diodes 25B–E are connected to the transfer points A of relays R14—8T, R14—4T, R14—2T and R14—1T, respectively, of register A in Fig. 1D. Depending upon whether the corresponding relay is energized or deenergized, these four diodes 25B–E are connected to the cathodes of the appropriate ones of tubes V8—15 in a manner and for the same purposes as described in connection with the relays of the first order of register A. It follows that the eighth order of register A is then read out during the same calculate cycle as, and in a similar manner to, the first order. Similar circuits, not shown, are provided for the orders intermediate the first and eighth orders.

For the value read-out of register B, the five-way coincidence circuit for the first order comprises five diodes 27A–E with their anodes connected to control the operation of a double triode V24 connected in parallel with triode V19 for the first order of register A. The cathode of diodes 27B–E are connected to the transfer points A of the corresponding relays in the first order of register B and through those relays to the appropriate ones of tubes V8—15 in an arrangement similar to that described in connection with the first order of register A.

The cathode of diode 27A is connected to line 245 in Figs. 1B and 1A to the cathode of a double triode V22. This double triode V22 corresponds in its action, with respect to diode 27A, to double triode V17 in Fig. 1A in the latter's action with respect to diode 24A for the first order of register A. In other words, the arrangement is such that the cathode voltage of triode V22 acts through diode 27A in Fig. 1B to prevent triode V24 from becoming more conductive except during each of the 11A to 20A pulses from box 161 in Fig. 1A coincident with a control pulse from box 163 for read-out of register A.

The grids of double triode V22 are connected through a diode 32A and line 214B to the cathode of the dual triode V30, and are also connected through a diode 32B to the cathode of tube V21. As previously explained, triode V30 has a positive pulse appearing thereon during each of the 11A–20A pulses and the cathode tube V21 has a positive pulse thereon throughout the control pulse from the box 163. Since the diodes 32A and 32B form an "and" circuit, double triode V22 will cause a positive pulse to be applied to the diode 27A in Fig. 1B during each of the 11A–20A pulses so long as the control pulse for read-out of register B is applied. Accordingly, tube V24 in Fig. 1B will become more conductive and provide a pulse at its cathode at a time corresponding to that one of the 11A–20A pulses which represents the value stored in the first order of register B when read-out of that register is performed.

The eighth order of register B is read out through the coincidence circuit provided by the five diodes 28A–E in Fig. 1B connected to control the double triode V25 which is in parallel with tube V20. The arrangement of these diodes with their corresponding relays is similar to that described for the first order of register B. It is to be noted that similar circuit arrangements are made for the read-out of the other orders in register B, not shown.

It is also to be noted that through the circuits incorporating tubes V16 and V17 in Fig. 1A as associated with diodes 23B and 24A—25A in Fig. 1B for register A, and tubes V21 and V22 in Fig. 1A as associated with diodes 26B and 27A—28A in Fig. 1B for register B, the two registers A and B cannot be read at the same time although the different orders in the same register selected for read-out are read at the same time.

In describing the read-in circuits hereinbefore, the storing of a −9 value in the first order relays of register A was described. This resulted in relays R12—S, R13—1U and R13—8U in Fig. 1D being energized while the other relays in the order remained deenergized.

Let it now be assumed that the −9 is still stored in the first order of register A and is to be read out. As previously indicated, the +9AB and the 11A–20A pulses are being repeatedly supplied, once in each successive card cycle, whether or not a read-out is being effected. Then to obtain a read-out from register A, a control pulse is supplied from box 164 in Fig. 1A. The control pulse is effective through tube V16 to raise the voltage applied to the cathode of diode 23B. Since relay R12—S in the first order of register A in Fig. 1D is energized, representing a minus sign, the voltage applied to the cathode of diode 23C in Fig. 1B is also raised. Consequently, when the next +9AB pulse is received raising the voltage applied to diode 23A, tube V18 in Fig. 1D becomes conductive and causes a pulse to be produced on the sign line S of exit channel 30.

Following this read-out of the sign, the read-out of the stored value is accomplished during the succeeding 11A–20A pulses. It will be recalled that the +9AB pulse also effected a reset of the counter of Fig. 1C to the 9 value pattern. Since the control pulse for read-out of register A is still in existence, the voltage applied to diode 24A in Fig. 1B is raised during each of the 11A–20A pulses. At the 11A pulse the counter is in its 9 value pattern and at successive ones of the 11A—20A pulses, the counter is in different patterns representing successively lower values as shown in the table hereinbefore. Since the relays of the first order of register A in Fig. 1D are energized to represent the value 9 and since the counter is in the 9 pattern during the 11A pulse, the voltages applied to the cathodes of all of the diodes 24B–E are raised simultaneously during that 11A pulse, so that an output pulse is provided from tube V19 at the 11A time representing a 9 value, which pulse causes a similar pulse on the units line U of exit channel 30.

In this manner, the −9 stored in the first order of register A is read out in the form of timed pulses on the appropriate lines of exit channel 30.

*General*

There has been described and illustrated a storage system which includes a storage device having a plurality of distinguishable stable states of equilibrium for use in storing different data. Although the specific storage device illustrated comprises a set of storage relays for each decimal digit or character to be stored, which set has a plurality of coded combinations of energization and deenergization of the relays, other codes and other storage devices having the plurality of states may be employed.

Information or data may be read in to the storage device by any well-known means, such as the sensing of a punched card as described, to cause the storage device to assume and maintain one of its states of equilibrium corresponding to the particular data read-in.

The system also includes a data representing device provided for read-out purposes and having the same or a greater number of distinguishable stable states of equilibrium, for use in representing different data, than are used in the storage device for storing data. The specific data representing device illustrated comprises a chain of electronic trigger circuits having a plurality of coded combinations of On and Off states. One of the stable states of the data representing devices may then be designated to correspond to each different stable state of the data storing device.

The data representing device is capable of assuming, and, for read-out purposes is caused to assume, its different stable states in succession in a given order. As a result, the data representing device at some time during such read-out operation assumes the stable state corresponding to that of the storage device with the data stored therein. Comparing means are provided to detect when such correspondence exists between the states of the data storage and data representing devices, and to provide a signal or signals indicating the data stored.

This arrangement provides a simple, inexpensive and reliable storage system with a high speed read-out. It is to be noted also that, while the read-in and read-out of a plurality of characters has been described in a parallel operation, they may obviously be accomplished in a serial operation if desired.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A number storage system comprising a first storage device settable to represent a selected digit, a second storage device settable to represent the sign of said selected digit, a counter having a plurality of stable states representing different digits, electrical impulse means connected to said counter to supply a reset impulse thereto and thereafter to supply thereto a series of discrete impulses at time coded intervals, said counter being responsive to said reset impulse to assume an initial state and responsive to the termination of each impulse of said series to assume another of its states with said series of impulses causing said counter to assume its different states in succession in a given order, a sign detecting circuit connected to said impulse means to be gated by and during said reset impulse and connected to said second storage device to indicate, while gated, the sign of the selected digit, and comparing circuits connected to said impulse means to be gated by and during each impulse of said series and connected to said first storage device and said counter to provide an output signal, while gated, when the counter state corresponds to the selected digit.

2. A storage system comprising a storage device for storing a multiple digit number and having a storage unit for each digit of the number which is settable to represent any selected digit and also having an additional storage unit settable to represent the sign of the number, a single counter having the plurality of stable states representing different digits, electrical impulse means connected to said counter to supply a reset impulse thereto and thereafter to supply thereto a series of discrete impulses at time coded intervals, said counter being responsive to said reset impulse to assume an initial state and responsive to the termination of each impulse of said series to assume another of its states with said series of impulses causing said counter to assume its different states in succession in a given order, a sign detecting circuit connected to said impulse means to be gated by and during said reset impulse and connected to said additional storage unit to indicate, while gated, the sign of the number, and a comparing circuit for each of the storage units with each comparing circuit connected to the impulse means to be gated by and during each impulse of said series and connected to its corresponding storage unit and said counter to provide an output signal, while gated, when the same digit is represented in both.

References Cited in the file of this patent

UNITED STATES PATENTS

| | | |
|---|---|---|
| 2,533,242 | Gridley | Dec. 12, 1950 |
| 2,539,043 | Verneaux | Jan. 23, 1951 |
| 2,568,724 | Earp et al. | Sept. 25, 1951 |
| 2,607,006 | Hoeppner | Aug. 12, 1952 |
| 2,609,439 | Marshall et al. | Sept. 2, 1952 |
| 2,611,813 | Sharpless | Sept. 23, 1952 |
| 2,615,127 | Edwards | Oct. 21, 1952 |
| 2,629,827 | Eckert et al. | Feb. 24, 1953 |
| 2,641,696 | Woolard | June 9, 1953 |
| 2,693,593 | Crosman | Nov. 2, 1954 |
| 2,737,342 | Nelson | Mar. 6, 1956 |

OTHER REFERENCES

"Sign Correction in Modulus Convention," by T. J. Rey and R. E. Spencer, pp. 41–46 plus 1 sheet of 2 figures, High Speed Automatic Calculating-Machines Conference, 22–25 June 1949, issued Jan. 1950 by University Mathematical Laboratory, Cambridge.

Progress Report (2) on the EDVAC; Moore School of Electrical Engineering; U. of Pa., Feb. 13, 1947 (pp. 1-1-14 to 1-1-15; Figures PY-O-103, PY-O-104, PY-O-119).

"A magnetic Digital Storage System," by Andrew D. Booth; Electronic Engineering; July 1949; pages 234–238.

"An Electronic Digital Computer" by Andrew D. Booth; Electronic Engineering; Dec. 1950; pages 492–498.

A Digital Computer Timing Unit, R. M. Goodman, Proceedings of the IRE, Sept. 1951; vol. 39, No. 9. (Pages 1051–1054 only.)

U. S. DEPARTMENT OF COMMERCE

PATENT OFFICE

CERTIFICATE OF CORRECTION

Patent No. 2,826,357 John J. Lentz March 11, 1958

It is hereby certified that error appears in the printed specification of the above numbered patent requiring correction and that the said Letters Patent should read as corrected below.

Column 1, line 71, for "high computer" read -- high speed computer --.

Signed and sealed this 10th day of June 1958.

(SEAL)
Attest:

KARL H. AXLINE
Attesting Officer

ROBERT C. WATSON
Commissioner of Patents